(12) United States Patent
Rajamani et al.

(10) Patent No.: US 8,700,796 B2
(45) Date of Patent: Apr. 15, 2014

(54) MAC DATA SERVICE ENHANCEMENTS

(75) Inventors: Krishnan Rajamani, San Diego, CA (US); Soumya Das, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 248 days.

(21) Appl. No.: 12/983,567

(22) Filed: Jan. 3, 2011

(65) Prior Publication Data

US 2012/0072609 A1    Mar. 22, 2012

Related U.S. Application Data

(60) Provisional application No. 61/385,503, filed on Sep. 22, 2010.

(51) Int. Cl.
*G06F 15/16* (2006.01)
*G06F 3/00* (2006.01)

(52) U.S. Cl.
USPC ........... 709/231; 709/230; 709/232; 370/230; 370/473

(58) Field of Classification Search
USPC ................ 709/231, 230, 232; 370/230, 474, 370/230.474
See application file for complete search history.

(56) References Cited

U.S. PATENT DOCUMENTS

| | | | |
|---|---|---|---|
| 7,929,599 B2 | 4/2011 | Ganesh et al. | |
| 8,320,448 B2 | 11/2012 | Zhao et al. | |
| 2005/0152358 A1 | 7/2005 | Giesberts et al. | |
| 2005/0195858 A1* | 9/2005 | Nishibayashi et al. | ....... 370/474 |
| 2006/0072831 A1 | 4/2006 | Pallister | |
| 2006/0107166 A1 | 5/2006 | Nanda | |
| 2006/0215563 A1 | 9/2006 | Trainin | |
| 2007/0153916 A1 | 7/2007 | Demircin et al. | |
| 2007/0165590 A1 | 7/2007 | Kneckt et al. | |
| 2008/0075004 A1* | 3/2008 | Mishima | ....................... 370/230 |
| 2008/0240233 A1 | 10/2008 | Au et al. | |
| 2009/0103625 A1 | 4/2009 | Lee et al. | |

(Continued)

FOREIGN PATENT DOCUMENTS

| | | |
|---|---|---|
| EP | 2003844 A1 | 12/2008 |
| EP | 2076041 A1 | 7/2009 |
| JP | 2012023765 A | 2/2012 |
| WO | WO2006036661 A1 | 4/2006 |

OTHER PUBLICATIONS

Nakajima et al., "Compressed Block Ack, an efficient selective repeat mechanism for IEEE8O2. 1 In", 2005 IEEE 16th International Symposium on Personal, Indoor and Mobile Radio Communications. pp. 1479-1483.

(Continued)

*Primary Examiner* — Beemnet Dada
*Assistant Examiner* — Kalish Bell
(74) *Attorney, Agent, or Firm* — Donald C. Kordich

(57) ABSTRACT

Wireless video transmissions over a MAC layer employ various techniques to improve throughput which may negatively impact latency, such as Block-ACK and data aggregation. To improve latency while continuing to improve throughput, data packets are fenced according to application layer specifications and then transmitted. For video data, Block-ACK sequences and aggregation sequences are terminated at the end of video frames or video slices. For data aggregation, a physical layer data packet concludes at the end of a video frame or slice. The application layer can indicate to the MAC layer when such packet fencing is to occur. In use with 802.11n transmission a data flag may be used by the MAC layer to facilitate fencing.

25 Claims, 4 Drawing Sheets

(56) References Cited

U.S. PATENT DOCUMENTS

2009/0285114 A1    11/2009  Uchida
2010/0091801 A1*    4/2010  Itakura et al. ............... 370/475
2010/0303153 A1   12/2010  Kadono
2012/0243602 A1    9/2012  Rajamani et al.

OTHER PUBLICATIONS

Ahmad, et al., "Multimedia transcoding in mobile and wireless networks," Information Science Reference, Hershey, New York (2009). (See p. 218).

Ferre P., et al., "Robust Video Transmission Over Wireless LANs", IEEE Transactions on Vehicular Technology, IEEE Service Center, Piscataway, NJ, US, vol. 57, No. 4, Jul. 1, 2008, pp. 2596-2602, XP011224081, ISSN: 0018-9545, DOI: 10.1109/TVT.2007.909258* sections I I, III and IV*.

International Search Report and Written Opinion—PCT/US2011/052791—ISA/EPO—Dec. 20, 2011.

Lin Y., et al., "WSN01-1: Frame Aggregation and Optimal Frame Size Adaptation for IEEE 802.11n WLANs", Global Telecommunications Conference, 2006. GLOBECOM '06. IEEE, IEEE, PI, Nov. 1, 2006, pp. 1-6, XP031075927, ISBN: 978-1-4244-0356-1.

Xiao, Yang: "IEEE 802.11N: Enhancements for Higher Throughput in Wireless LANs" IEEE Wireless Communications, IEEE Service Center, Piscataway, NJ, vol. 12, No. 6, Dec. 1, 2005, pp. 82-91.

Yin J., et al., "Optimal packet size in error-prone channel for IEEE 802.11 distributed coordination function", Wireless Communications and Networking Conference, 2004. WCNC. 2004 IEEE 26,27 Atlanta, GA, USA Mar. 21-25, 2004, Piscataway, NJ, USA,IEEE, vol. 3, Mar. 21, 2004, pp. 1654-1659, XP010708041, D0I: 10.1109/WCNC.2004.1311801 ISBN: 978-0-7803-8344-9 figures 4-6 * three last line of first paragraph of section I *; p. 1654, left-hand column first paragraph; p. 1655, right-hand column * section II * figures 10,13,18,19.

* cited by examiner

MAC DATA SERVICE ENHANCEMENTS

CROSS REFERENCE TO RELATED APPLICATION

This application claims the benefit of U.S. provisional patent application No. 61/385,503 filed Sep. 22, 2010, in the names of RAJAMANI, et. al, the disclosure of which is expressly incorporated herein by reference in its entirety.

TECHNICAL FIELD

The present description is related, generally, to data processing for wireless displays.

BACKGROUND

Mobile communication and computing continue to converge. Technological advances in Smartphone platforms have broadened their usage to a variety of applications beyond voice calls. These include Internet communication, location based services, entertainment and office productivity. Rapid advances in processing power, storage capacity, high-resolution display processing, video codecs and short-range connectivity have all played a significant role in transforming the Smartphone.

SUMMARY

A method for wirelessly transmitting data over a communication link is offered. The method includes aggregating data packets into a first group. The method also includes receiving an indication when a final data packet completes the first group. The method further includes completing aggregation of packets into the first group upon receipt of the final data packet and the indication. The method further includes transmitting the first group.

A method for streaming video over a communication link that aggregates data is offered. The method includes aggregating data packets based on a fence so data only from a first video segment is aggregated together. The method also includes transmitting the aggregated data packets.

An apparatus operable to wirelessly transmit data over a communications link includes means for aggregating data packets into a first group. The apparatus also includes means for receiving an indication when a final data packet completes the first group. The apparatus further includes means for completing aggregation of packets into the first group upon receipt of the final data packet and the indication. The apparatus further includes means for transmitting the first group.

An apparatus operable to stream video over a communication link that aggregates data includes means for aggregating data packets based on a fence so data only from a first video segment is aggregated together. The apparatus also includes means for transmitting the aggregated data packets.

A computer program product operable to wirelessly transmit data over a communications link is offered. The computer program product includes a computer-readable medium having program code recorded thereon. The program code includes program code to aggregate data packets into a first group. The program code also includes program code to receive an indication when a final data packet completes the first group. The program code further includes program code to complete aggregation of packets into the first group upon receipt of the final data packet and the indication. The program code further includes program code to transmit the first group.

A computer program product operable to stream video over a communication link that aggregates data is offered. The computer program product includes a computer-readable medium having program code recorded thereon. The program code includes program code to aggregate data packets based on a fence so data only from a first video segment is aggregated together. The program code also includes program code to transmit the aggregated data packets.

An apparatus operable to wirelessly transmit data over a communications link is offered. The apparatus includes a processor(s) and a memory coupled to the processor(s). The processor(s) is configured to aggregate data packets into a first group. The processor(s) is also configured to receive an indication when a final data packet completes the first group. The processor(s) is further configured to complete aggregation of packets into the first group upon receipt of the final data packet and the indication. The processor(s) is further configured to transmit the first group.

An apparatus operable to stream video over a communication link that aggregates data is offered. The apparatus includes a processor(s) and a memory coupled to the at least one processor. The processor(s) is configured to aggregate data packets based on a fence so data only from a first video segment is aggregated together. The processor(s) is also configured to transmit the aggregated data packets.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

One remaining hurdle in mobile computing convergence is the size of typical portable liquid crystal displays (LCDs), which are constrained by the small form-factor of mobile devices. Tethering the phone to a larger external display panel with cables is not always practical or desirable. A more attractive solution is to enable phones 101 to wirelessly render their display output to a larger external monitor 104 (or digital television (DTV), or digital light processing (DLP), or automotive display), as seen in FIG. 1.

Figure 1:
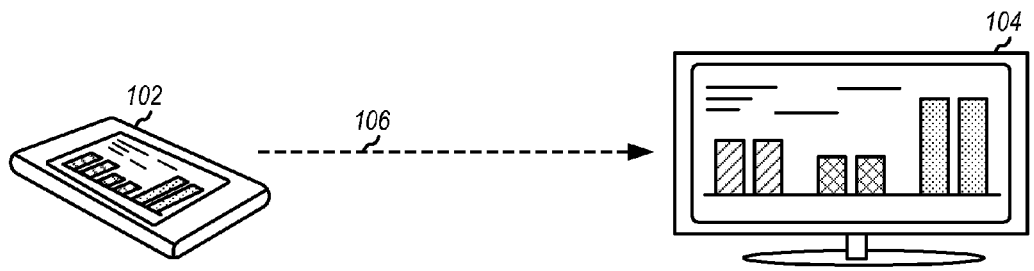
FIG. 1 illustrates use of a wireless display.

Such wireless displays are intended to replace the audio-video cable between the Smartphone and an external display, with a short-range wireless link 106 as shown in FIG. 1. An example of such a cable being replaced is High-Definition Multimedia Interface (HDMI). General-purpose Wireless Display is intended to satisfy Smartphone applications which render their audio-visual output on the Smartphone display. This may also be referred to as mirrored-display or extended-display.

Such displays are distinct from wireless audio/visual (AV) distribution solutions such as Digital Living Network Alliance (DLNA) and Network-Attached-Storage devices, which serve stored content over a home network. More recently, DLNA is also envisioned to bridge Internet Protocol Television (IPTV) and other service-provider content into a home network. In such cases, the AV content is typically pre-compressed, and not dynamically generated by applications running on a mobile device.

Table 1 below shows examples of applications that may benefit from a Wireless Display, examples of the types of external displays, and examples of environments they may be used in. The distinction relative to DLNA is apparent from the full range of source applications beyond just Media Players. The distinction relative to existing remote-display software packages is apparent from the need to support full-motion video for Media Players and Games.

TABLE 1

Example Usage model matrix

| Source Applications | Displays | Environment |
| --- | --- | --- |
| Media Players | Digital TV | Home |
| Games | Desktop | Office |
| Word processors, | Monitor | Hotel |
| Spreadsheet apps | DLP | Automobile |
| Presentation apps | Touchscreen | Kiosk |
| Navigation apps | Laptop | |
| Call managers | display | |
| Internet Browsers | | |
| Email | | |
| Social networking | | |

Touchscreens are unique in that they may also employ reverse link payload for touch input to the Smartphone.

The term Smartphone as used herein may refer to any mobile computing device capable of outputting a video signal for use with wireless display such as Smartbooks, laptop computers, etc.

Typically wireless displays are configured for short range operation. Assuming data compression various short-range modems and associated spectra may be used:

Ultra-Wideband (UWB)/Wireless universal serial bus (USB) (3.1-10.6 GHz)
60 GHz
802.11 (2.4 GHz, 5 GHz)

802.11n media access control (MAC) implementations are optimized for high throughput and MAC efficiency. Several 802.11n techniques improve MAC efficiency for video streaming. Use of AC-VI traffic class allows occupation of the medium for a longer time, resulting in transmission of increased amounts of data and decreased overhead in accessing the medium. Use of block acknowledgment/negative-acknowledgement (ACK/NACK) alleviates waiting for an acknowledgement for each packet and instead uses an acknowledgement for a series of packets, allowing failed packets to be selectively retransmitted. Smaller packets are also aggregated into a larger packet to be sent as one unit, or multiple MAC layer packets are collapsed into a single physical layer packet, thereby reducing overhead due to multiple physical layer packets. Aggregation variants include A-MSDU (for MAC service data units (MSDUs)), A-MPDU, (for MAC protocol data units (MPDUs)), and A-PPDU for physical layer protocol data units (PPDUs)).

The combination of these techniques improves MAC efficiency for video streaming. However such optimizations result in additional end to end latency. This is typically not an issue for applications such as real time streaming protocol (RTSP) and DLNA, where the video source is typically pre-compressed, and the playback receiver buffers a few seconds worth of video to ensure jitter-free playback. On the other hand, the latency specifications for Wireless Display is more stringent than a media server usage model such as DLNA.

Throughput and MAC efficiency are essential for Wireless Display as well, i.e. Aggregation, Block-ACK, and AC-VI are indeed desirable for Wireless Display. What we need is a way to utilize these MAC techniques without undue latency penalty. Two particular problems, video decode stalls and inaccurate time stamps, are addressed below.

Video Decode Stalls:

Block ACKs used by 802.11n, ECMA-368, and similar MAC systems allow the transmitter MAC to send multiple MAC protocol data units (MPDUs) to the receiver MAC, without requiring a MAC ACK per MPDU. While this increases MAC efficiency, it can result in additional latency since the receiver MAC is obliged to internally buffer out-of-order MAC service data units (MSDUs) caused by transmission errors. Selective retransmission to release these MSDUs at the receiver MAC is delayed until the Block-ACK event which indicates the MSDUs which need selective retransmission. The Block-ACK event is delayed until the transmitter exhausts (or terminates) the transmission opportunity (TXOP) and allows the receiver to send its Block-ACK. This delay is exacerbated as TXOP duration is necessarily larger for the AC-VI traffic class designed for higher throughput and efficiency.

In an effort to improve MAC efficiency and Block-ACK efficacy, the transmitter MAC may also perform Aggregation of MPDUs and/or MSDUs either opportunistically or as a threshold policy. Such aggregation further increases Block-ACK delays.

The above latency is particularly a concern where an aggregated block of packets does not contain complete data for a single video frame. If video frame data is spread across multiple packets, frames that have arrived at the receiver MAC wait to be processed until the missing frames can be received in forthcoming blocks, causing additional delays. As a result, the Wireless Display receiver may incur additional delay in receiving video frame MSDUs; which may stall the Decode pipeline, and result in user-perceived delay in the display.

This issue is not as serious if the Decoder can start decoding only after an entire video frame is delivered. But even in these cases, stalls may occur, since a Block ACK sequence may often straddle consecutive video frames as the MAC layer does not distinguish or consider video frame boundaries.

Existing systems do not attempt to mitigate these delays in their implementation of AC-VI, Block-ACK, and Aggregation policies which are primarily aimed at throughput efficiency. As a result, the receiver application incurs additional delay in receiving video frame MSDUs which delays subsequent processing steps in the pipeline (decode, post-process, render), which in turn may result in a user-perceived delay in updates to the display.

Timestamps for TX-Completion:

To bound delays caused by unexpected transmission error rates (significant excursions from nominal packet error rate (PER)), the transmitter application may need to adapt, by skipping frames, or by scaling other Encoder parameters (e.g., Encoder Qp, frame rate, resolution, etc.). Such adaptation techniques can be triggered if the MAC SAP provides the transmitter application with TX-completion timestamps which denote successful delivery of a full video frame to the receiver MAC. With Aggregation and/or Block-ACK, the timestamp for successful transmission of a specific video frame may not be readily available, if the Block-ACK window straddles successive video frames. Existing systems either do not provide a timestamp, or do not attempt to provide an accurate timestamp compensating for Block-ACK usage.

Figure 2:
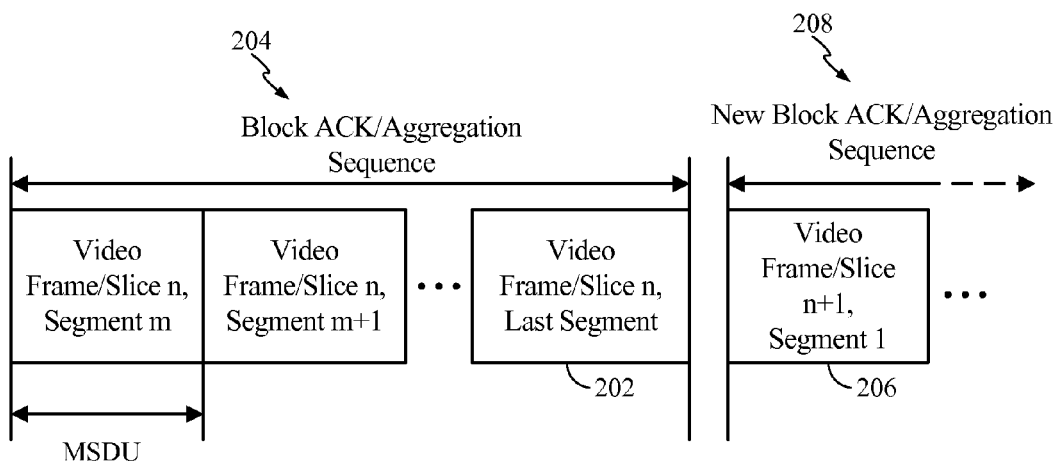
FIG. 2 illustrates data aggregation framing according to one aspect.

One solution to the above two problems, is to fence Block-ACK/NACK windows and any aggregation sequences at video frame boundaries, as shown in FIG. 2. First the transmitter ensures that no Block-ACK window straddles successive video frames; i.e. while any single video frame may be composed of one or more Block ACK sequences, a Block ACK sequence is unconditionally terminated whenever it encounters the terminal MSDU corresponding to the end of a particular video frame's worth of data. As shown in FIG. 2, when the final MSDU segment 202 of the video frame is reached, the first Block ACK Sequence 204 completes and the next segment 206 will be the first segment in New Block ACK Sequence 208. A similar process applies to aggregation sequences, where a new aggregation sequence will be started following the final data packet of the video frame. The application provides the MAC with information so that the MAC knows to terminate the Block ACK sequence and aggregation sequence based on indications from the application layer.

Second, MAC DATA service access point (SAP) may be enhanced to allow higher layers to flag whether the MSDU should fence a Block ACK window or an aggregation sequence that it may be part of. The transmitting application on the Host may set this flag for the terminal MSDU corresponding to each Video frame.

This fencing mechanism ensures that the receiver MAC would never delay the delivery of any portion of a video frame, while receiving parts of the next video frame out-of-order. Hence decode, post-processing, and rendering for a video frame would never be delayed by ongoing wireless transmission of the next video frame.

In one aspect, data packets are aggregated into a single physical layer packet and the block ACK/NACK is for the physical layer packet. In this aspect, all of the aggregated data packets are within a single physical layer packet based on an application layer fence, such as a video frame. In another aspect, data packets are not aggregated into a single physical layer packet. Rather, data packets are sent as they arrive from the application layer as separate physical layer packets. A single block ACK/NACK occurs based on the reception status of all physical layer packets of a group, where the group is defined by the application layer fence (e.g. video frame) supplied by the application.

The above is particularly useful in video receiver implementations which cannot handle out of order delivery of fragments of a video frame (compressed or otherwise). Some implementation may not even start the decode stage until all fragments of a video frame are delivered. Without the Block-ACK fencing, the receiver video/display pipeline would be stalled, while a future video frame is being transmitted ahead of the retransmissions necessary to complete the current video frame.

The above techniques and solutions are not limited to video data, and may be used to coordinate communications between a receiver and transmitter to decrease latency for various data types. For example, audio data or other data which is high in volume and sensitive to latency.

MAC DATA SAP may be enhanced to allow the transmitting application to optionally request a TX-completion timestamp coinciding with the transmission of the final packet in the sequence. With Block-ACK and aggregation fencing enabled, the TX-completion timestamp for the terminal MSDU for every video frame is readily available, and may be provided via an enhanced MAC SAP. Therefore the transmitter application may use the MAC Data SAP to request the TX-completion timestamp selectively for the final MSDU of every Video frame. In conjunction with other statistics (such as short-term average MAC retry counts, which may also be returned by the MAC DATA service), the TX-completion timestamp provides a basis for detecting TX latency accumulation, and to trigger suitable adaptation policies in the transmitter application.

FIG. 2 and the accompanying description illustrate a full video frame as the operating pipeline unit for the Encoder and Decoder. The teachings above may also be implemented using slices of a video frame. The pipeline transfer unit implements Block ACK fencing at the boundaries of these frame slices.

When used over a direct link, this fencing mechanism may be implemented local to the Smartphone. It does not need any protocol changes, and is transparent to the Display receiver.

Out-of-order delivery at the receiver may also be enabled. For Video receiver implementations which are able to process fragments of a Video frame out of order (e.g. decode of H.264 slices), the Block-ACK fencing mechanism at the transmitter may be complemented by a receiver MAC configuration that allows out-of-order delivery of MSDUs.

The receiver MAC delivers each successfully received MSDU to the application even when there are holes in sequence numbers caused by transmission errors. To facilitate this, the MAC SAP is enhanced to enable this behavior selectively per MAC traffic class, or based on other higher layer parameters such as differentiated services code point (DSCP). With this behavior, a sophisticated Video receiver may decode slices of a Video frame out of order, and not have to stall the decode pipeline upon transmission errors.

At the same time, the Block-ACK fencing at the transmitter ensures that the Video subsystem would not have to handle Video frames or slices out of order, i.e. decode of any fragment of a Video frame does not have to start until the previous Video frame has been completely received and decoded. This is particularly useful for inter-frame coding.

If it is desired to preserve ordering across Video frames, then the receiver application would know if the transmitter application has enabled Block-ACK fencing before enabling out-of-order delivery by the receiver MAC. This would entail protocol signaling at either the application layer, or signaling at the MAC layer per traffic class.

Figures 3A, 3B:
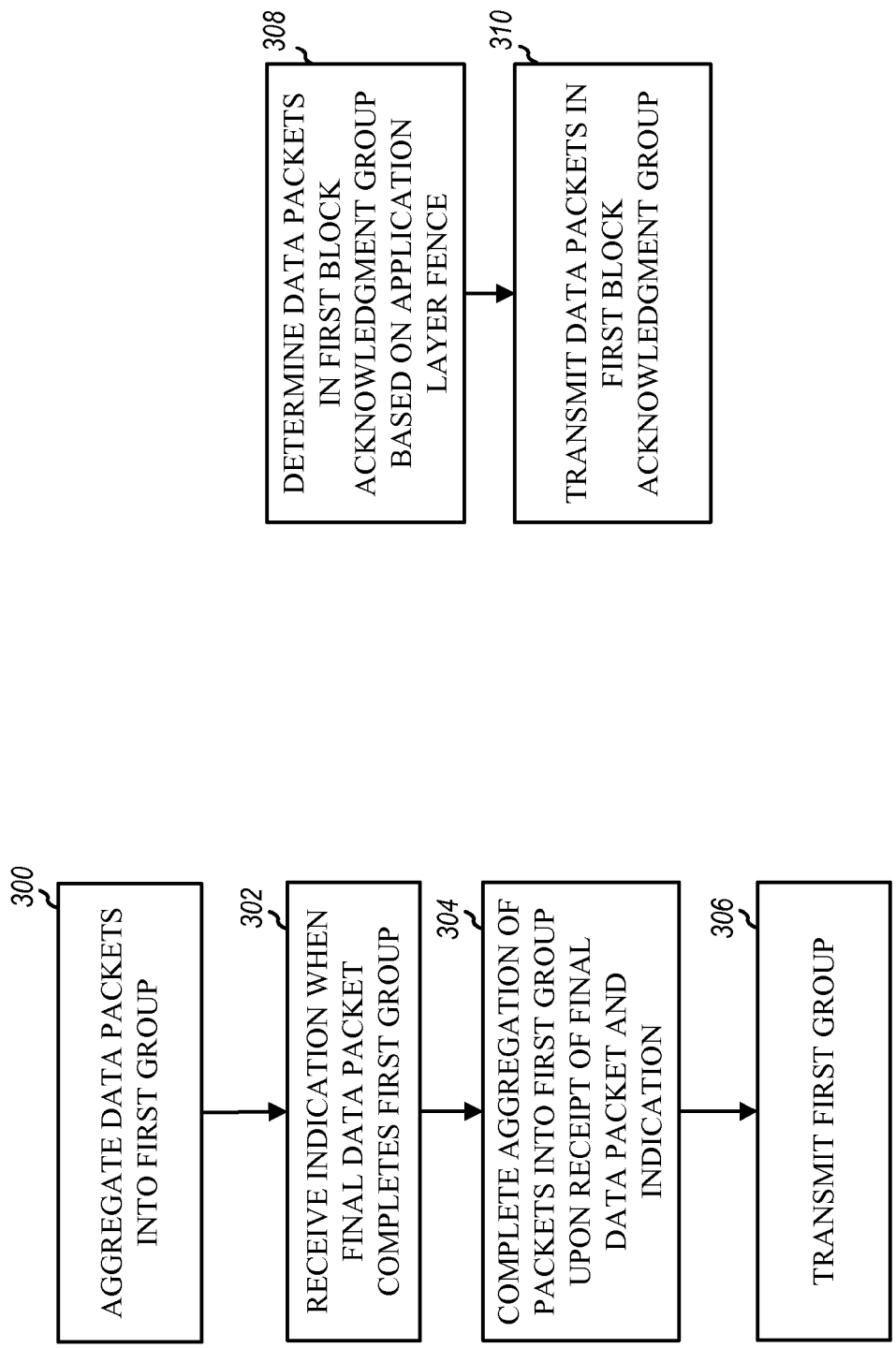
FIG. 3A illustrates data aggregation framing according to one aspect.
FIG. 3B illustrates data aggregation framing according to one aspect.

FIG. 3A illustrates data aggregation framing according to one aspect. An apparatus aggregates data packets into a first group as shown in block 300. Next the apparatus receives an indication when a final data packet completes the group, as shown in block 302. The apparatus then completes aggregation of packets into the first group upon receipt of the final data packet and the indication, as shown in block 304. The apparatus then transmits the first group, as shown in block 306.

FIG. 3B illustrates data aggregation framing according to another aspect. An apparatus determines data packets to be included in a first block acknowledgement group based on an application layer fence (e.g., a video frame), as shown in block 308. The apparatus transmits the data packets of the first block acknowledgment group individually as physical layer packets as shown in block 310. Some time after transmitting all of the physical layer packets, the apparatus then receives a block ACK/NACK for all data packets in the first block acknowledgment group.

Figure 4:
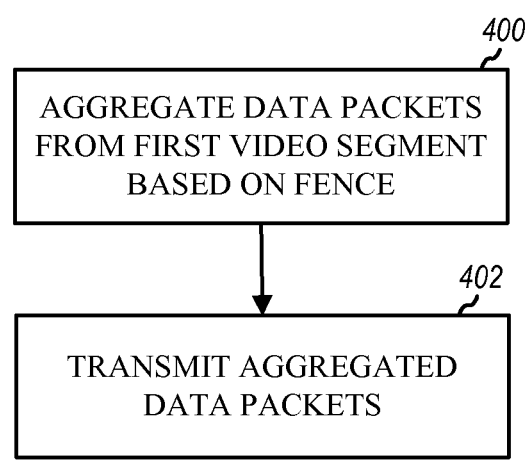
FIG. 4 illustrates data aggregation framing according to one aspect.

FIG. 4 illustrates data aggregation framing according to one aspect. An apparatus aggregates data packets based on a fence so data only from a first video segment frame is aggregated together, as shown in block 400. The apparatus then transmits the aggregated data packets as shown in block 402.

Figure 5:
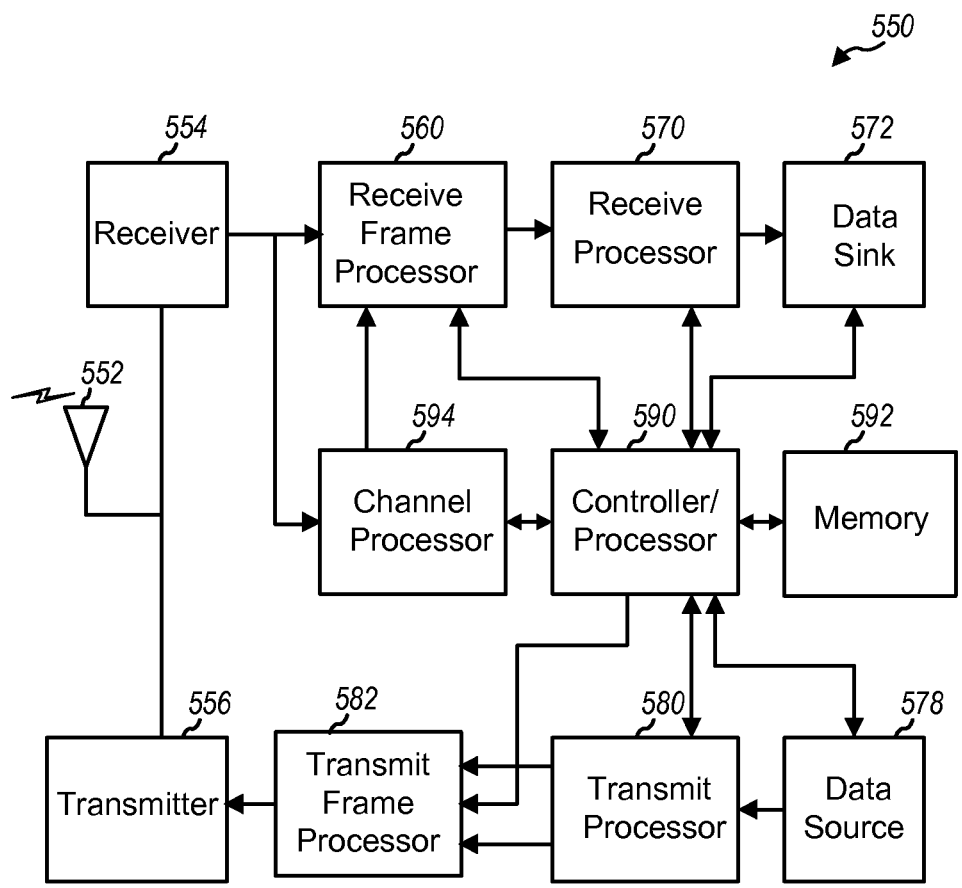
FIG. 5 illustrates a device capable of wireless communication according to one aspect.

FIG. 5 shows a block diagram of a design of a device which may be used to wirelessly transmit data over a communications link. The device 550 may be a handset used for mobile telephone communications, for example. A receiver 554 may receive transmission through an antenna 552. The information recovered by the receiver 554 may be provided to a channel processor 594 and to a receive frame processor 560, which then passes data to a receive processor 570. The receive processor 570 may then perform various operations on the received data. Processed data may be provided to a data sink 572, which represents applications running in the device 550 and/or various user interfaces (e.g., displays). The controller/processor 590 may also process data from the receiver 554 or the data sink 572.

Transmission data from a data source 578 or from the controller/processor 590 are provided to a transmit processor 580. The data source 578 may represent applications running in the device 550 and various user interfaces (e.g., keyboard, pointing device, track wheel, and the like). The transmit processor 580 and transmit frame processor 582 may perform various functions for wireless communication prior to a signal being sent to the transmitter 556 and sent over a wireless medium through the antenna 552.

The controller/processor 590 may be used to direct the operation of the device 550. For example, the controller/processors 590 may provide various functions including timing, peripheral interfaces, voltage regulation, power management, wireless display control, and other control functions. The computer readable media of memories 592 may store data and software.

In one aspect, the device 550 is configured for wireless communication including means for aggregating data packets into a first group, means for receiving an indication when a final data packet completes the first group, means for completing aggregation of packets into the first group upon receipt of the final data packet and the indication, and means for transmitting the first group. The device may also include means for means for aggregating data packets based on a fence so data only from a first video segment is aggregated together, and means for transmitting the aggregated data packets. In one aspect, the aforementioned means may be the controller/processor 590, the memory 592, the data sink 572, the data source 578, the transmit processor 580, the transmitter 556, and the antenna 552, configured to perform the functions recited by the aforementioned means. In another aspect, the aforementioned means may be a module or any apparatus configured to perform the functions recited by the aforementioned means.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the present disclosure is not intended to be limited to the aspects shown herein but is to be accorded the widest scope consistent with the principles and novel features disclosed herein.

What is claimed is:

1. A method for wirelessly transmitting data over a communication link, the method comprising:
   aggregating data packets into a first group, in which the first group comprises a physical layer packet;
   receiving an indication from an application layer when a final data packet completes the first group;
   completing aggregation of packets into the first group upon receipt of the final data packet and the indication;

transmitting the first group; and generating and providing to a transmitter application a transmission-completion timestamp coinciding with a transmission of the final data packet.

2. The method of claim 1 in which the first group comprises a block acknowledgement sequence.

3. The method of claim 1 in which the communication link comprises an IEEE 802.11n-2009 media access control layer interface.

4. The method of claim 1 in which the data packets contain video data.

5. The method of claim 4 in which the final data packet comprises a last segment of data corresponding to a video frame.

6. The method of claim 4 in which the final data packet comprises a last segment of data corresponding to a video slice.

7. A method for streaming video over communication link that aggregates data, the method comprising:

aggregating data packets based on an application layer fence so data only from a first video segment is aggregated together;

transmitting the aggregated data packets as a physical layer packet; and generating and providing to a transmitter application a transmission-completion timestamp coinciding with a transmission of a final data packet.

8. The method of claim 7 in which the first video segment is a video frame.

9. The method of claim 7 in which the first video segment is a video slice.

10. An apparatus operable to wirelessly transmit data over a communications link, the apparatus comprising:

means for aggregating data packets into a first group, in which the first group comprises a physical layer packet;

means for receiving an indication from an application layer when a final data packet completes the first group;

means for completing aggregation of packets into the first group upon receipt of the final data packet and the indication;

means for transmitting the first group; and means for generating and providing to a transmitter application a transmission-completion timestamp coinciding with a transmission of the final data packet.

11. The apparatus of claim 10 in which the first group comprises a block acknowledgement sequence.

12. The apparatus of claim 10 in which the data packets contain video data and the final data packet comprises a last segment of data corresponding to a video frame.

13. An apparatus operable to stream video over a communication link that aggregates data, the apparatus comprising:

means for aggregating data packets based on an application layer fence so data only from a first video segment is aggregated together;

means for transmitting the aggregated data packets as a physical layer packet; and means for generating and providing to a transmitter application a transmission-completion timestamp coinciding with a transmission of a final data packet.

14. A computer program product operable to wirelessly transmit data over a communications link, comprising:

a non-transitory computer-readable medium having program code recorded thereon, the program code comprising:

program code to aggregate data packets into a first group, in which the first group comprises a physical layer packet;

program code to receive from an application layer an indication when a final data packet completes the first group;

program code to complete aggregation of packets into the first group upon receipt of the final data packet and the indication;

program code to transmit the first group; and program code to generate and provide to a transmitter application a transmission-completion timestamp coinciding with a transmission of the final data packet.

15. The computer program product of claim 14 in which the first group comprises a block acknowledgement sequence.

16. The computer program product of claim 14 in which the data packets contain video data and the final data packet comprises a last segment of data corresponding to a video frame.

17. A computer program product operable to stream video over a communication link that aggregates data, comprising:

a non-transitory computer-readable medium having program code recorded thereon, the program code comprising:

program code to aggregate data packets based on an application layer fence so data only from a first video segment is aggregated together;

program code to transmit the aggregated data packets as a physical layer packet; and program code to generate and provide to a transmitter application a transmission-completion timestamp coinciding with a transmission of a final data packet.

18. An apparatus operable to wirelessly transmit data over a communications link, the apparatus comprising:

at least one processor; and a memory coupled to the at least one processor, the at least one processor being configured:

to aggregate data packets into a first group, in which the first group comprises a physical layer packet;

to receive an indication from an application layer when a final data packet completes the first group;

to complete aggregation of packets into the first group upon receipt of the final data packet and the indication;

to transmit the first group; and to generate and provide to a transmitter application a transmission-completion timestamp coinciding with a transmission of the final data packet.

19. The apparatus of claim 18 in which the first group comprises a block acknowledgement sequence.

20. The apparatus of claim 18 in which the data packets contain video data and the final data packet comprises a last segment of data corresponding to a video frame.

21. An apparatus operable to stream video over a communication link that aggregates data, the apparatus comprising:

at least one processor; and a memory coupled to the at least one processor, the at least one processor being configured:

to aggregate data packets based on an application layer fence so data only from a first video segment is aggregated together;

to transmit the aggregated data packets as a physical layer packet; and to generate and provide to a transmitter application a transmission-completion timestamp coinciding with a transmission of a final data packet.

22. The apparatus of claim 21 in which the first video segment is a video frame.

23. The apparatus of claim 21 in which the first video segment is a video slice.

24. A method for wirelessly transmitting data over a communication link, the method comprising:
- determining data packets to be aggregated into a first block acknowledgement group based on an application layer fence;
- transmitting the data packets of the first block acknowledgement group as a physical layer packet; and
- generating and providing to a transmitter application a transmission-completion timestamp coinciding with a transmission of a final data packet.

25. The method of claim 3 in which the indication comprises a flag in the IEEE 802.11n-2009 media access control layer interface.

* * * * *